US008823686B2

(12) United States Patent
Karayel et al.

(10) Patent No.: US 8,823,686 B2
(45) Date of Patent: Sep. 2, 2014

(54) OPERATING DEVICE FOR A USER INTERFACE

(75) Inventors: Emin Karayel, Pforzheim (DE); Carsten Kraus, Pforzheim (DE)

(73) Assignee: Omikron Data Quality GmbH, Pforzheim (DE)

( * ) Notice: Subject to any disclaimer, the term of this patent is extended or adjusted under 35 U.S.C. 154(b) by 547 days.

(21) Appl. No.: 13/110,058

(22) Filed: May 18, 2011

(65) Prior Publication Data

US 2011/0292004 A1 Dec. 1, 2011

(30) Foreign Application Priority Data

May 27, 2010 (DE) ...................... 20 2010 007 315 U

(51) Int. Cl.
*G06F 3/033* (2013.01)
(52) U.S. Cl.
USPC .......................................................... 345/184
(58) Field of Classification Search
None
See application file for complete search history.

(56) References Cited

U.S. PATENT DOCUMENTS

| | | | | |
|---|---|---|---|---|
| 5,617,114 A | | 4/1997 | Bier et al. ....................... 345/113 |
| 7,184,991 B1 * | | 2/2007 | Wentland et al. ................ 706/45 |
| 7,295,706 B2 * | | 11/2007 | Wentland et al. ............. 382/181 |
| 7,669,338 B2 * | | 3/2010 | Allen, Jr. .......................... 33/265 |
| 8,581,187 B2 * | | 11/2013 | Kijima et al. ................... 250/307 |
| 2006/0075355 A1 * | | 4/2006 | Shiono et al. .................. 715/778 |
| 2011/0074677 A1 | | 3/2011 | Ording et al. .................. 345/158 |

FOREIGN PATENT DOCUMENTS

| | | | | |
|---|---|---|---|---|
| DE | 694 26 548 | | 5/2001 | ............. G06F 3/033 |
| DE | 11 2007 002 088 | | 7/2009 | ............. G06F 3/048 |

* cited by examiner

*Primary Examiner* — Joseph Feild
*Assistant Examiner* — Parul Gupta
(74) *Attorney, Agent, or Firm* — Kusner & Jaffe

(57) ABSTRACT

The present invention relates to an operating device for a user interface and a method for generating a control signal by way of a user interface. For example, the operating device comprises operating elements and a control device, by means of which at least one control signal can be generated in a manner dependent on the state of the operating elements. The operating device comprises a first at least two-dimensional element and a second elongate element, which are displaceable relative to one another in at least two different directions. Furthermore, the operating device comprises a control device, by means of which, on the basis of the relative position of the second elongate element with respect to the first at least two-dimensional element, an overlap of the two elements can be detected and at least one control signal with interval values can be generated in a manner dependent on said overlap.

27 Claims, 3 Drawing Sheets

OPERATING DEVICE FOR A USER INTERFACE

FIELD OF THE INVENTION

The present invention relates to an operating device for a user interface and a method for generating a control signal by way of a user interface. For example, the operating device comprises operating elements and a control device, by means of which at least one control signal can be generated in a manner dependent on the state of the operating elements.

BACKGROUND OF THE INVENTION

Conventional operating devices, for example, comprise mechanical operating elements, such as rotary actuators or pushbutton switches, for example, which generate an electrical signal that is converted, by a control device, into a control signal for a device to be operated.

Furthermore, it is conventional, in the case of a graphical user interface, to display operating elements on a display area. Said operating elements can be actuated by means of an input device, which can comprise a cursor controller, for example. The actuation on the display area by means of the input device is detected by the control device and converted into a control signal for the device to be operated. The device to be operated can be an external device or the display device itself.

SUMMARY OF THE INVENTION

Example embodiments of the present invention provide an operating device of the type mentioned in the introduction which can be actuated very simply and intuitively by the user in order to generate a desired control signal.

The operating device according to example embodiments of the invention comprises a first at least two-dimensional element and a second elongate element, which are displaceable relative to one another in at least two different directions. Furthermore, the operating device comprises a control device, by means of which, on the basis of the relative position of the second elongate element with respect to the first at least two-dimensional element, an overlap of the two elements can be detected and at least one control signal with interval values can be generated in a manner dependent on said overlap.

Within the meaning of the invention, an overlap is understood such that, on account of the relative arrangement of the two elements with respect to one another, it is possible to define a section on the elongate element, the size and the position of the section being dependent on the relative position of the two elements with respect to one another.

In accordance with one configuration of the operating device for example, the interval values of the control signal comprise an interval width that is dependent on the size of the overlap between the first at least two-dimensional element and the second elongate element in a longitudinal direction of the second elongate element. Furthermore, for example, the interval values of the control signal can comprise an interval position that is dependent on the position of the overlap of the first at least two-dimensional element on the second elongate element. The interval position and the interval width can therefore define an interval. Furthermore, for example, it is also possible for the interval values of the control signal to define the two limits of the interval by means of the overlap between the first at least two-dimensional element and the second elongate element.

If the longitudinal extent of the elongate element is assigned to an ordered overall set, in particular a subset of the overall set can be defined by the interval values of the control signal which result from the overlap between the two elements.

In the case of the operating device of example embodiments, it is therefore possible for one of the two elements, for example the first at least two-dimensional element, to be displaced by a single movement and for two values for the control signal to be defined by the definition of the relative position of the two elements with respect to one another. The two values can completely define a specific interval.

In accordance with a further configuration of the operating device of example embodiments, the first element is a two-dimensional areal element. A section on the second elongate element can be defined on the basis of the overlap between the areal element and the second elongate element. In this case, the interval values of the control signal are dependent on the size and position of the section within the second elongate element. Consequently, the overlap between the two elements can be altered by the displacement of the areal element or of the elongate element. On the basis of the relative position of the two elements and the resultant overlap, for the user in the case of the operating device according to example embodiments this visualizes what kind of control signal is generated by the control device. The elongate element and the areal element overlap, in particular, only partly, wherein the size of the overlap is variable in a manner dependent on the relative position of the two elements with respect to one another.

Furthermore, the areal element can be displaced relative to the elongate element such that the elongate element is situated substantially completely within the areal element. In this case, the interval values correspond to the overall set assigned to the elongate element. On the other hand, the two elements can also be positioned such that the elongate element is situated completely outside the areal element. In this case, the interval values correspond to the empty set, that is to say that the interval contains no values.

The areal element is configured, in particular, such that the transverse extent increases or decreases continuously in one direction. Consequently, if the areal element is displaced on the elongate element in a direction perpendicular to the transverse extent of the areal element, the overlap between the two elements continuously increases or decreases. On the other hand, if the areal element is displaced in the transverse direction, there is a change in the position of the overlap on the elongate element, but not in the size of the overlap.

The areal element is, for example, a triangle, in particular. In this case, the elongate element is oriented, in particular, parallel to a side of the triangle of the areal element. This orientation is preferably also maintained if the relative position of the two elements with respect to one another is altered.

The triangle of the areal element can be, for example, an isosceles triangle, in particular a right-angled triangle. In this case, the elongate element is oriented, in particular, parallel to the base or the hypotenuse of the triangular element. In this case, the length of the elongate element can correspond to the length of the base or the hypotenuse of the triangle of the areal element. However, the elongate element can also be longer than the base or the hypotenuse of the triangle of the areal element.

In accordance with another configuration of example embodiments of the operating device, the areal element comprises, for example, a semicircle or a semiellipse. In this case, too, the transverse extent of the areal element increases or decreases upon movement on an axis of the semicircle or semiellipse.

In accordance with one configuration of example embodiments of the operating device, the areal element and the second elongate element are displaceable relative to one another in a plane at least in a longitudinal direction of the second elongate element and the direction perpendicular thereto, the orientation of the two elements with respect to one another being maintained during the displacement.

An elongate element within the meaning of the invention is understood to be any element in a two-dimensional area or a three-dimensional space which defines a longitudinal extent. Consequently, a substantially one-dimensional element which is arranged on a two-dimensional area or in three-dimensional space is involved, in particular. In order that the elongate element can be configured or visualized better, however, it can also have an extent in a direction transversely with respect to the longitudinal extent, such that this element can also be embodied as a bar, strip, line or scale. Although the elongate element is preferably straight, it is also possible for the elongate element to have curvatures.

Consequently, in the case of the operating device of example embodiments, two overlapping geometrical figures are provided as operating elements. As a result of the overlap, a section on the elongate element is defined by the at least two-dimensional element, i.e. in particular the areal element or the triangle. By choosing this section, the user can define the interval values particularly simply and intuitively during the positioning of the two elements with respect to one another. At the same time, as a result of the elements being displayed, the interval values of the control signal are visualized in such a way that they can be rapidly and intuitively registered by the user.

The elongate and the at least two-dimensional elements can, for example, be mechanical operating elements which can be displaced relative to one another by the user. Preferably, however, the operating device according to the invention comprises a display area, by means of which the areal and the elongate element can be displayed. Furthermore, the operating device according to the invention preferably comprises an input device, by means of which the areal and the elongate element can be displaced relative to one another.

The input device can be, for example, a cursor controller, by means of which the displayed elements or one of the displayed elements can be displaced. A mechanical actuation element or a touch-sensitive area, i.e. a so-called touchpad, can be provided for the cursor controller. Furthermore, a touch-sensitive surface can be provided on the display area, such that a so-called touch screen is provided. In this case, the user can touch the touch-sensitive surface at the position at which one of the elements is displayed. If the user then displaces the touched position on the touch-sensitive surface, the control device also changes the display on the display area such that the corresponding element is displaced. If the user then releases the touch from the touch-sensitive surface, the control device can generate, and if appropriate output, the control signal in a manner dependent on the relative position of the two elements with respect to one another.

In accordance with one development of example embodiments of the operating device, the areal element can be at least partly inserted and/or removed in a manner dependent on the actuation of the input device. In particular, the display area can be driven e.g. by the control device such that the areal element is at least partly displayed if it is actuated by means of the input device. If the areal element is not actuated, in this case it is not displayed either. By way of example, it is possible that only that part of the areal element which overlaps the elongate element is displayed if it is actuated by means of the input device. Furthermore, it would be possible that—if appropriate after some operating processes—the areal element is actually no longer displayed completely, but rather only the overlap with the elongate element, but the corresponding actuations of the input device still have the effect that the control signal is generated with the interval values.

The invention furthermore comprises a method for generating a control signal by way of a user interface. In the method, a first areal element and a second elongate element are displayed on a display area. The first and the second element are displaced relative to one another by means of an input device in such a way as to result in an overlap between the two elements, which is detected by a control device. The control device then generates at least one control signal with interval values in a manner dependent on the overlap between the first and the second element. The control signal with the interval values can then be output.

The method can be implemented, in particular, by the operating device described above, such that all the features of said operating device can be realized in the method.

The invention will now be explained on the basis of an exemplary embodiment with reference to the figures.

DETAILED DESCRIPTION OF THE INVENTION

Figure 1:
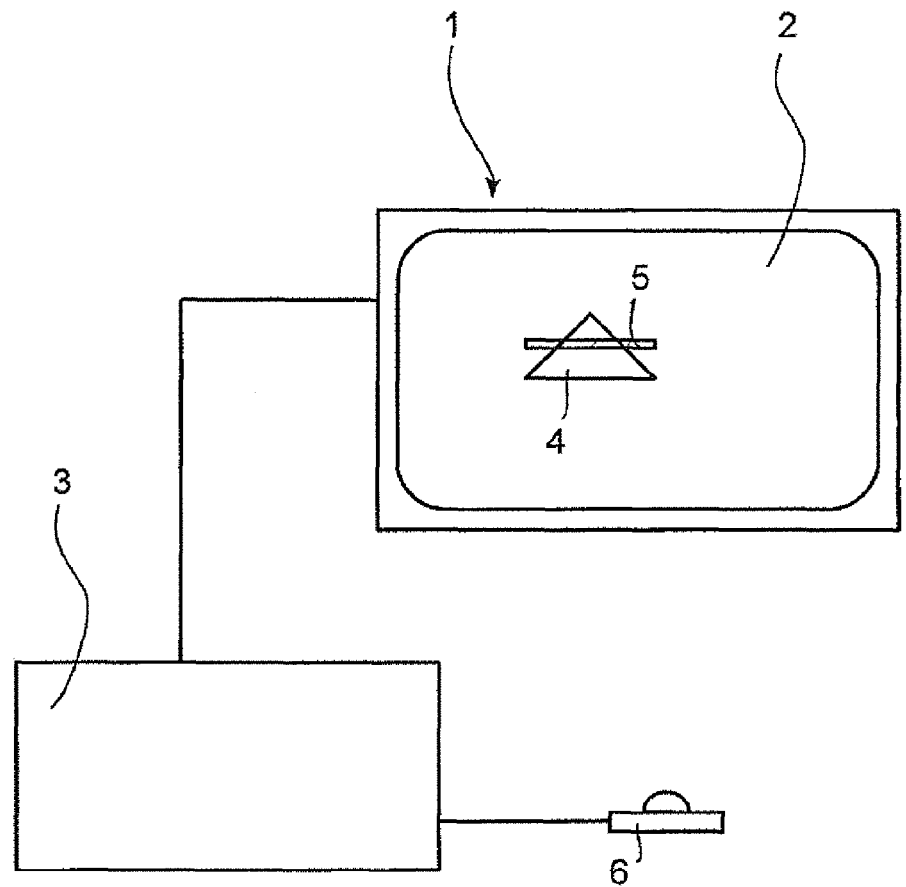
FIG. 1 schematically shows the construction of an operating device according to example embodiments of the invention.

In the below-described exemplary embodiment of the operating device according to the invention and the associated method for generating a control signal, the first at least two-dimensional element is an areal element in the form of a right-angled or isosceles triangle which is displayed on a display area. However, it is pointed out that said element could also be a three-dimensional element which could be represented in three-dimensional space or as a projection onto a two-dimensional area. Furthermore, instead of a triangle, the element could also have any other geometrical shape. Moreover, a right-angled or isosceles triangle need not necessarily be involved. Any triangle having respectively different side lengths could also be displayed.

The operating device comprises a display device 1 having a display area 2. The display area 2 can be provided, for example, by a freely programmable matrix display known per se, for example a liquid crystal display. The display device 1 is coupled to a control device 3, which generates graphical data for display on the display area 2. By means of the control device 3, in particular a display with the triangular element 4 and an elongate element 5 can be produced on the display area 2. The triangular element 4 is an isosceles triangle, in particular. In the example shown here, the triangular element 4 is a right-angled triangle.

Furthermore, the operating device comprises an input device 6. By means of said input device 6, the user can displace the relative position of the triangular element 4 displayed on the display area 2 with respect to the elongate element 5. The input device 6 can be, for example, an electronic mouse or a touch-sensitive zone which, in conjunction with the control device 3, provide a cursor controller by means of which the user can displace elements displayed on the display area 2. Alternatively, the input device 6 could comprise a touch-sensitive surface on the display area 2. A touch screen known per se is provided in this case.

The control device 3 detects the relative position—defined by the user—of the triangular element 4 with respect to the elongate element 5 and generates one control signal or a plurality of control signals in a manner dependent on this relative position of the two elements 4 and 5 with respect to one another. The control device 3 can then output the control signals to an external device to be operated, or use them for controlling the display device 1.

The elements 4 and 5 thus provide a control element for a graphical user interface. By means of the input device 6, the user can select, i.e. for example click on, and displace the elongate element 5 and/or the triangular element 4 relative to the respective other element.

With reference to FIGS. 2-5, an explanation is given of how the user can generate control signals with interval values by choosing the relative position of the two elements 4 and 5 with respect to one another:

the triangular element 4 can be positioned within specific limits relative to the elongate element 5, which is displayed as stationary in this example. In the example described here, the triangular element 4 can be displaced in a longitudinal direction away from the elongate element 5 to such an extent that it is situated completely outside the elongate element 5. In this case, the two elements 4 and 5 do not overlap. In another limiting case, the elongate element 5 is positioned completely within the triangular element 4. Between these two limiting cases, the triangular element 4 can be positioned on the elongate element 5 in such a way that an overlapping section having the length B arises. A section having the length A arises on the left-hand side of the elongate element 5, said section not overlapping the triangular element 4. Furthermore, a section having the length C arises on the other, right-hand side, said section not overlapping the triangular element 4. Overall, the lengths A, B and C of these sections of the elongate element 5 produce the length L of the elongate element 5, which, in the case shown here, corresponds to the length of the hypotenuse of the triangle of the element 4.

It is equally possible to displace the elongate element 5 instead of the triangular element 4. All that is important is that the relative position of the two elements 4 and 5 changes with respect to one another.

The elongate element 5 is oriented in its longitudinal direction parallel to the hypotenuse of the triangular element 4. If the elements 4 and 5 are displaced relative to one another on the display area 2, the parallel orientation of the longitudinal direction of the elongate element 5 with respect to the hypotenuse of the triangular element 4 is maintained.

A specific overall set or a range of values can be assigned to the elongate element 5. It is assumed below as an example that a range of values of the numbers 0 to 100 is assigned to the length L of the elongate element 5. By positioning the triangular element 4 relative to the elongate element 5, the user can then define a specific interval or a specific subset in said range of values. In this case, the length B of the section of the elongate element 5 which overlaps the triangular element 4 defines the size or width of the interval. In this case, the interval width selected corresponds to the ratio of the length B to the total length L of the elongate element 5. If the length B is e.g. one quarter of the total length L, the interval width is 25.

Figure 2:
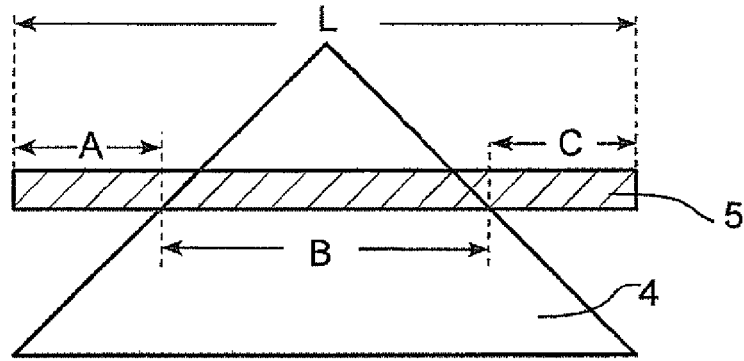
FIGS. 2-5 show examples of positioning of the elongate element and of the areal element of exemplary embodiments of the operating device according to the invention.
Figure 3:
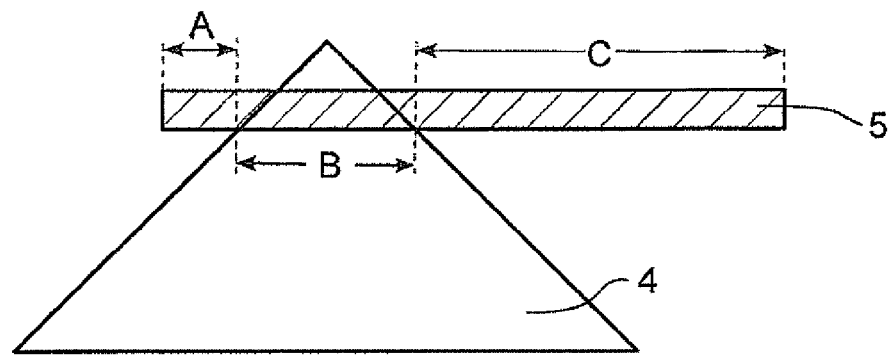
Figure 4:
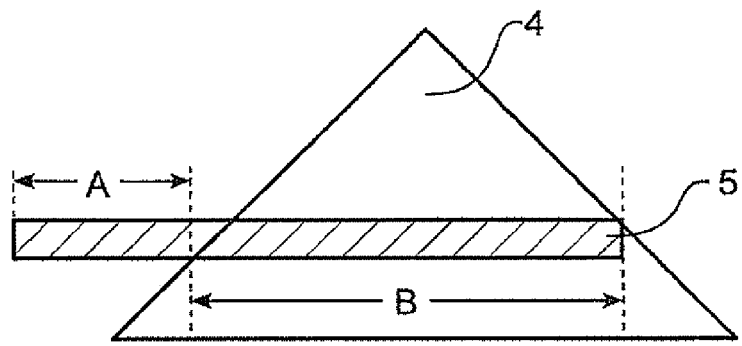
Figure 5:
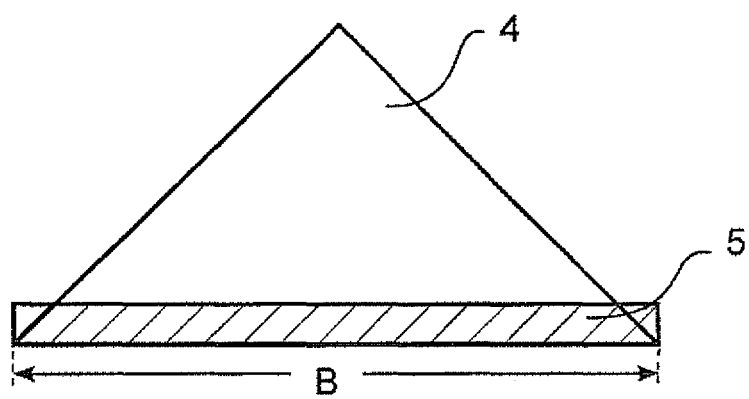

The user can then alter the interval width by using the input device 6 to displace the triangular element 4 perpendicularly to the longitudinal direction of the elongate element 5, that is to say upward or downward in the case of the illustration in accordance with FIGS. 2-5. If the elongate element 5, as shown in FIG. 5, is situated right at the bottom on the hypotenuse of the triangular element 4, the entire range of values is selected. If the triangular element 4 is moved further downward, the length B of the section of the elongate element 5 which overlaps the triangular element 4 changes, as is shown in FIGS. 2-4.

By means of the positioning of the triangular element 4, however, the user is able not only to define the interval size or interval width, but also to define the interval limits. Specifically, if the user moves the triangular element 4 in a longitudinal direction of the elongate element 5, that is to say toward the right or toward the left in the illustration in accordance with FIGS. 2-5, the lengths of sections A and C of the elongate element 5 which do not overlap the triangular element 4 change. By means of the ratios of the lengths A, B and C of the elongate element 5, it is possible in this way to define proportionally which interval limits are selected within the range of values that is assigned to the length L of the elongate element 5. If, by way of example, in the arrangement of the two elements 4 and 5 in accordance with FIG. 3, the length A is one tenth of the total length L, the interval begins at the value 10. The control device 3 can generate and, if appropriate, output one control signal or a plurality of control signals in a manner dependent on the interval limits defined by the positioning of the elements 4 and 5 and on the interval width defined thereby.

The selection defined by means of the relative positioning of the two elements 4 and 5 can supplementarily also be displayed by a separate digital display. Alternatively or additionally, a scale on the basis of which the observer can read off the selection can also be arranged on the elongate element 5.

It is pointed out that the elongate element 5 can also be embodied differently. However, the elongate element 5 must define a longitudinal extent which, during the positioning relative to the triangular element 4, defines a variable section that overlaps the triangular element 4. The elongate element 5 can therefore be configured e.g. as a bar, a strip, line or scale.

Furthermore, it is not necessary for the longitudinal extent L of the elongate element 5 to correspond to the length of a side of the triangular element 4. The elongate element 5 could also be longer, in particular. In this case, it would not be possible, for example, to select the overall set which is assigned to the length of the elongate element 5. In that case only a genuine subset could be selected.

The operating device according to the invention can be used for example in conjunction with an online shop, wherein individual price limits can be input by means of the positioning of the two elements 4 and 5 by means of a single movement of one of the elements 4, 5. Furthermore, the control signal or the control signals generated by means of the control device 3 or the positioning of the two elements 4 and 5 can be used to define screen sizes, battery running times or similar intervals.

In accordance with one development of the operating device according to the invention and of the associated method, an active and a passive state are defined for the control element formed from the two elements 4 and 5. An activation of the control element can be effected, for example, by a marker being moved into the vicinity of the control element by means of the input device 6. In the activated state, the control element is represented as shown in FIGS. 2-5. In the deactivated state, that is to say if, for example, the marker (cursor) has been moved away from the elements 4 and 5, the region outside the elongate element 5 can be temporarily masked out. The space available on the display area 2 can be optimally utilized in this way. If the user uses the marker to click on that region of the control element which is displayed in the deactivated state, the two elements 4 and 5 are completely displayed again and the relative position of these two elements 4 and 5 with respect to one another can be altered by the user by means of the input device 6.

In accordance with another development of the operating device according to the invention and of the associated method, the triangle of the areal element 4 is only visible when it is currently being operated. In this case, it is possible to use a plurality of different areal elements 4 in conjunction with the elongate element 5 simultaneously, e.g. in an online shop for televisions for the selection of the integral values for the price, size, resolution and frequency. By masking out the currently inactive triangles of the areal elements 4, it is possible to arrange a plurality of intervals one above another in the same region. Finally, it is possible for the areal element 4—as soon as a user has generally become accustomed to the control element—no longer to be displayed at all, but rather only imagined, or only for the overlap to be displayed: up and down movements by means of the input device 6 then widen the interval, left/right movements shift it in the same way as described above for the display of the areal element 4.

Having described the invention, the following is claimed:

1. An operating device for a user interface comprising:
    a first at least two-dimensional element and a second elongate element, wherein a set of values are associated with a longitudinal extent of the second elongate element, said first and second elements are displaceable relative to one another in at least two different directions, and
    a control device for (i) detecting an overlap of the first and second elements based upon the relative position of the second elongate element with respect to the first at least two-dimensional element, (ii) determining interval values that define a subset of values within said set of values dependent upon the detected overlap of the first and second elements, and (iii) generating at least one control signal providing the interval values.

2. The operating device as claimed in claim 1, wherein the interval values of the at least one control signal comprise an interval width that is dependent on the size of the overlap between the first at least two-dimensional element and the second elongate element in a longitudinal direction of the second elongate element.

3. The operating device as claimed in claim 1, wherein the interval values of the at least one control signal comprise an interval position that is dependent on the position of the overlap of the first at least two-dimensional element on the second elongate element.

4. The operating device as claimed in claim 1, wherein the first element is a two-dimensional areal element and a section on the second elongate element is defined on the basis of the overlap between the first areal element and the second elongate element, and the interval values of the at least one control signal are dependent on the size and position of the section within the second elongate element.

5. The operating device as claimed in claim 4, wherein the transverse extent of the areal element increases or decreases continuously in one direction.

6. The operating device as claimed in claim 4, wherein the areal element is a triangle.

7. The operating device as claimed in claim 6, wherein the second elongate element is oriented parallel to a side of the triangle of the areal element.

8. The operating device as claimed in claim 4, wherein the areal element comprises a semicircle or a semiellipse.

9. The operating device as claimed in claim 4, wherein the areal element and the second elongate element are displaceable relative to one another in a plane at least in a longitudinal direction of the second elongate element and the direction perpendicular thereto, the orientation of the two elements with respect to one another being maintained during the displacement.

10. The operating device as claimed in any of claim 4, wherein the operating device further comprises:
    a display area for displaying the areal element and the second elongate element, and
    an input device for displacing the areal element and the second elongate element relative to one another.

11. The operating device as claimed in claim 10, wherein the areal element can be at least partly inserted and/or removed in a manner dependent on the actuation of the input device.

12. The operating device as claimed in claim 11, wherein the display area can be driven in such a way that the areal element is at least partly displayed if it is actuated by means of the input device, and the areal element is not displayed if it is not actuated.

13. The operating device as claimed in claim 12, wherein the display area can be driven in such a way that only that part of the areal element which overlaps the elongate element is displayed if it is actuated by means of the input device.

14. A method for generating a control signal by way of a user interface, comprising:
    displaying a first areal element and a second elongate element on a display area, wherein a set of values are associated with a longitudinal extent of the second elongate element,
    displacing the first element and the second element relative to one another by operation of an input device in such a way as to result in an overlap between the first and second elements,
    detecting with a control device said overlap between the first and second elements based upon the relative position of the second element with respect to the first element,
    determining with the control device interval values that define a subset of values within said set of values dependent upon the detected overlap of the first and second elements,
    generating with the control device at least one control signal providing the interval values, and
    outputting the at least one control signal providing the interval values.

15. The method as claimed in claim 14, wherein the interval values of the at least one control signal comprise an interval width that is dependent on the size of the overlap between the first at least two-dimensional element and the second elongate element in a longitudinal direction of the second elongate element.

16. The method as claimed in claim 14, wherein the interval values of the at least one control signal comprise an interval position that is dependent on the position of the overlap of the first at least two-dimensional element on the second elongate element.

17. The method as claimed in claim 14, wherein the first element is a two-dimensional areal element and a section on the second elongate element is defined on the basis of the overlap between the first areal element and the second elongate element, and the interval values of the at least one control signal are dependent on the size and position of the section within the second elongate element.

18. The method as claimed in claim 17, wherein the transverse extent of the areal element increases or decreases continuously in one direction.

19. The method as claimed in claim 17, wherein the areal element is a triangle.

20. The method as claimed in claim 19, wherein the second elongate element is oriented parallel to a side of the triangle of the areal element.

21. The method as claimed in claim 17, wherein the areal element comprises a semicircle or a semiellipse.

22. The method as claimed in claim 17, wherein the areal element and the second elongate element are displaced relative to one another in a plane at least in a longitudinal direction of the second elongate element and the direction perpendicular thereto, the orientation of the first and second elements with respect to one another being maintained during the displacement.

23. The method as claimed in claim 14, wherein the areal element is at least partly inserted and/or removed in a manner dependent on the actuation of the input device.

24. The method as claimed in claim 23, wherein the areal element is at least partly displayed if it is actuated by means of the input device, and the areal element is not displayed if it is not actuated.

25. The method as claimed in claim 24, wherein only that part of the areal element which overlaps the elongate element is displayed if it is actuated by means of the input device.

26. The operating device as claimed in claim 1, wherein the detected overlap of the first and second elements defines (i) an interval size of said subset of values and (ii) interval limits of said subset of values.

27. The method as claimed in claim 14, wherein the detected overlap of the first and second elements defines (i) an interval size of said subset of values and (ii) interval limits of said subset of values.

* * * * *